(12) United States Patent
Ahamad et al.

(10) Patent No.: US 10,600,583 B1
(45) Date of Patent: Mar. 24, 2020

(54) METHOD OF MAKING A POROUS NITROGEN-DOPED CARBON ELECTRODE FROM BIOMASS

(71) Applicant: KING SAUD UNIVERSITY, Riyadh (SA)

(72) Inventors: Tansir Ahamad, Riyadh (SA); MU. Naushad, Riyadh (SA); Abdullah M. Al-Enizi, Riyadh (SA); Saad M. Alshehri, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/118,379

(22) Filed: Aug. 30, 2018

(51) Int. Cl.
*H01G 11/00* (2013.01)
*H01G 11/86* (2013.01)
*H01G 11/44* (2013.01)
*H01G 11/34* (2013.01)

(52) U.S. Cl.
CPC ............ *H01G 11/86* (2013.01); *H01G 11/34* (2013.01); *H01G 11/44* (2013.01)

(58) Field of Classification Search
CPC .................................................... H01G 11/00
See application file for complete search history.

(56) References Cited

U.S. PATENT DOCUMENTS

| | | | |
|---|---|---|---|
| 6,743,500 B2 | 6/2004 | Takeda et al. | |
| 7,157,402 B2 | 1/2007 | Yu et al. | |
| 8,992,670 B1 | 3/2015 | Vohra | |
| 9,136,066 B2 | 9/2015 | Anouti et al. | |
| 9,346,678 B1* | 5/2016 | Alshehri | B01J 20/3078 |
| 2009/0126172 A1 | 5/2009 | Kobayashi et al. | |
| 2013/0089738 A1 | 4/2013 | Al-Zahrani et al. | |
| 2013/0155577 A1 | 6/2013 | Yang et al. | |
| 2014/0325807 A1 | 11/2014 | Anouti et al. | |
| 2016/0272502 A1 | 9/2016 | Zhu et al. | |
| 2016/0279558 A1 | 9/2016 | Vohra et al. | |

OTHER PUBLICATIONS

CN 105645408 A (Year: 2016).*

(Continued)

*Primary Examiner* — David P Turocy
*Assistant Examiner* — Mohammad Mayy
(74) *Attorney, Agent, or Firm* — Richard C. Litman; Nath, Goldberg & Meyer

(57) ABSTRACT

The method of making a porous nitrogen-doped carbon electrode from biomass is a chemical activation-based method of making a porous graphite carbon electrode for supercapacitors and the like. Date palm pollen grains are used as a precursor biomass carbon source for producing the porous graphite carbon. A volume of date palm (*Phoenix dactylifera* L.) pollen grains is mixed into an aqueous solution of potassium hydroxide to produce a precursor carbon solution. The precursor carbon solution is dried to produce precursor carbon, and the precursor carbon is heated in an inert atmosphere to produce porous nitrogen-doped graphite carbon. The porous nitrogen-doped graphite carbon is washed, dried and mixed with a polyvinylidene difluoride binder, carbon black, and a solvent to form a slurry. The slurry is then coated on nickel foam to form a porous nitrogen-doped carbon electrode. The porous nitrogen-doped carbon electrode is dried, weighted and pressed into a sheet electrode.

4 Claims, 6 Drawing Sheets

(56) References Cited

OTHER PUBLICATIONS

CN 106882786 A (Year: 2017).*
Nitrogen-doped porous carbon derived from biomass waste for high-performance supercapacitor, Guofu Ma, Qian Yang, Kanjun Sun, Hui Peng, Feitian Ran, Xiaolong Zhao, Ziqiang Lei, Bioresource Technology vol. 197, Dec. 2015, pp. 137-142 (Year: 2015).*
"3D Porous Hierarchical Microspheres of Activated Carbon from Nature through Nanotechnology for Electrochemical Double-Layer Capacitors", Lu Wei, Kuan Tian, Xingyan Zhang, Yiyi Jin, Tuo Shi, and Xin Guo, ACS Sustainable Chem. Eng. 2016, 4, 6463-6472. (Year: 2016).*
"High-Performance Supercapacitor Electrode Materials Prepared from Various Pollens", Long Zhang, Fan Zhang, Xi Yang, Kai Leng, Yi Huang, and Yongsheng Chen, small 2013, 9, No. 8, 1342-1347. (Year: 2013).*
Abdul-Khalil et al., "Activated carbon from various agricultural wastes by chemical activation with KOH: preparation and characterization." Journal of Biobased Materials and Bioenergy, vol. 7, 1-7, 2013.

\* cited by examiner

METHOD OF MAKING A POROUS NITROGEN-DOPED CARBON ELECTRODE FROM BIOMASS

BACKGROUND

1. Field

The disclosure of the present patent application relates to porous carbon electrodes, and particularly to a method of making a porous nitrogen-doped carbon electrode from biomass for supercapacitors and the like utilizing date palm (*Phoenix dactylifera* L.) pollen grains as the carbon source.

2. Description of the Related Art

A supercapacitor (also referred to as an electric double-layer capacitor) is a high-capacity capacitor with capacitance values much higher than other capacitors, but with lower voltage limits, that bridge the gap between electrolytic capacitors and rechargeable batteries. Supercapacitors typically store 10 to 100 times more energy per unit volume or mass than electrolytic capacitors, can accept and deliver charge much faster than batteries, and tolerate many more charge and discharge cycles than rechargeable batteries. Unlike ordinary capacitors, supercapacitors do not use a conventional solid dielectric. Rather, they use electrostatic double-layer capacitance and electrochemical pseudo-capacitance, both of which contribute to the total capacitance of the capacitor.

Electrostatic double-layer capacitors typically use carbon electrodes with much higher electrostatic double-layer capacitance than electrochemical pseudocapacitance, achieving separation of charge in a Helmholtz double layer at the interface between the surface of a conductive electrode and an electrolyte. The separation of charge is on the order of 0.3-0.8 nm, which is much smaller than that in a conventional capacitor. This extremely thin double-layer distance in a supercapacitor is made possible by the extremely large surface area of activated carbon electrodes. As is well known, activated carbon is a form of carbon processed to have small, low-volume pores that increase the surface area available for adsorption or chemical reactions. Due to its high degree of microporosity, just one gram of activated carbon has a surface area in excess of 3,000 $m^2$.

Solid activated carbon, also sometimes referred to as consolidated amorphous carbon (CAC), is the most commonly used electrode material for supercapacitors. It is produced from activated carbon powder pressed into the desired shape, forming a block with a wide distribution of pore sizes. An electrode with a surface area of about 1000 $m^2/g$ results in a typical double-layer capacitance of about 10 $\mu F/cm^2$ and a specific capacitance of 100 F/g. One of the most common sources for powdered activated carbon used in supercapacitors is coconut shells. Although coconut shells produce activated carbon with more micropores than that made from wood charcoal, the relative availability of coconuts in non-tropical regions makes coconut shells an expensive carbon precursor source. Additionally, the conversion process of coconut shells to activated carbon of sufficient purity for supercapacitor manufacture can be both expensive, time consuming and complex.

Further, it has been demonstrated that the incorporation of heteroatoms, such as sulfur, boron, nitrogen and oxygen, into the carbon lattice can significantly enhance mechanical, semiconducting, field emission, and electrical properties of carbon materials. For example, nitrogen doping is presently considered to be the most promising method for enhancing surface polarity, electric conductivity and electron-donor tendency of the activated carbon. To prepare these materials, one common approach involves the use of nitrogen-containing original precursors, such as ionic liquids, for pyrolysis. Another approach is to post-treat carbon with N-containing dopants, such as ammonia, amine or urea. Given the attractiveness of biomass an original precursor, in addition to factors such as cost, environmental friendliness and availability, nitrogen content of the biomass is also a consideration. In addition to finding a biomass carbon precursor that is readily available in large quantities in numerous places throughout the world, it would be desirable to provide a biomass precursor which is also nitrogen-rich. Thus, a method of making a porous nitrogen-doped carbon electrode from biomass solving the aforementioned problems is desired.

SUMMARY

The method of making a porous nitrogen-doped carbon electrode from biomass is a chemical activation-based method of making a porous graphite carbon electrode for supercapacitors and the like. Date palm pollen grains are used as a precursor biomass carbon source for producing the porous graphite carbon. A volume of date palm (*Phoenix dactylifera* L.) pollen grains is mixed into an aqueous solution of potassium hydroxide (KOH) to produce a precursor carbon solution. Date palm pollen grains are naturally rich in protein, which is used as a nitrogen source, as well as carbohydrates and sporopollenin, which are both sources of carbon. The precursor carbon solution is dried to produce precursor carbon, and the precursor carbon is heated in an inert argon atmosphere to produce porous nitrogen-doped graphite carbon. The porous nitrogen-doped graphite carbon is washed, dried and mixed with a polyvinylidene difluoride binder, carbon black, and an isopropanol solvent to form a slurry. The slurry is then coated on nickel foam to form a porous nitrogen-doped carbon electrode. The porous nitrogen-doped carbon electrode is dried, weighted and pressed into a sheet electrode.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
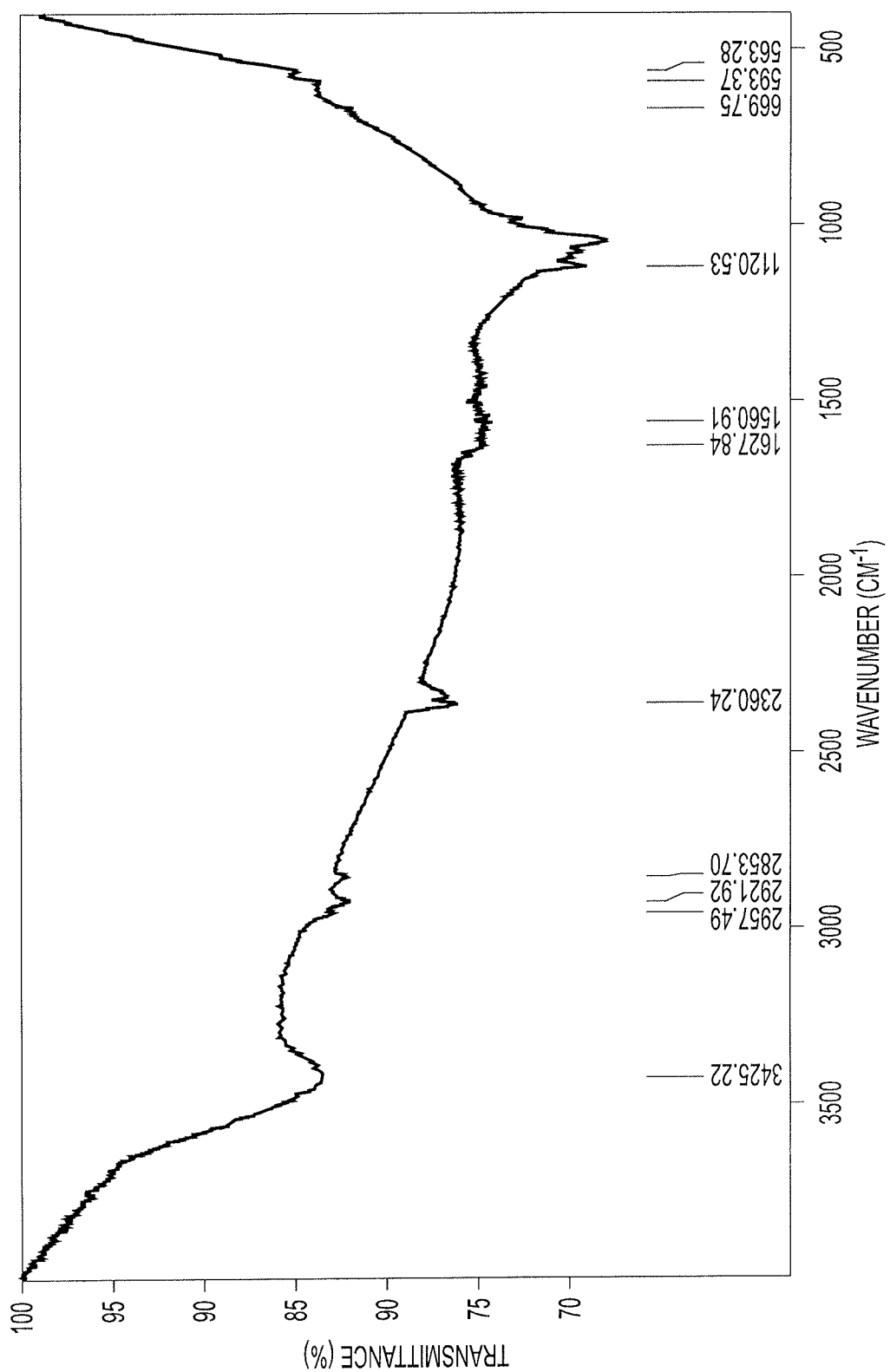
FIG. 1 is a graph showing Fourier transform-infrared (FTIR) results for porous nitrogen-doped graphite carbon prepared by the present method of making a porous nitrogen-doped carbon electrode from biomass.

The method of making a porous nitrogen-doped carbon electrode from biomass is a chemical activation-based method of making a porous graphite carbon electrode for supercapacitors and the like. Date palm pollen grains are used as a precursor biomass carbon source for producing the porous graphite carbon. A volume of date palm (*Phoenix dactylifera* L.) pollen grains is stirred into a 0.5 M aqueous solution of potassium hydroxide (KOH) to produce a precursor carbon solution. Date palm pollen grains are rich in protein, which is used as a nitrogen source, as well as carbohydrates and sporopollenin, which are both sources of carbon. The stirring to mix the pollen grains into the KOH solution occurs for approximately one hour. The precursor carbon solution is dried at about 80° C. for about six hours to produce precursor carbon. The precursor carbon is heated in an inert argon atmosphere to produce porous nitrogen-doped graphite carbon. The heating of the precursor carbon occurs at a temperature of about 800° C. for about two hours, and may take place in a tube furnace with a heating rate of about 5° C./min.

The porous nitrogen-doped graphite carbon is then cooled to room temperature, followed by washing in 1.0 M HCl solution, deionized water and ethanol (several times), followed by drying at a temperature of about 80° C. for about 24 hours. The porous nitrogen-doped graphite carbon is then mixed with carbon black and a polyvinylidene difluoride (PVDF) binder in a mass ratio of 8:1:1. This mixture is then solvated in isopropanol solvent to form a slurry. The slurry is coated on nickel foam and dried overnight at a temperature of about 100° C. to form a porous nitrogen-doped carbon electrode. The porous nitrogen-doped carbon electrode is then weighted and pressed at a pressure of about 10 MPa into a sheet electrode having a thickness of about 300±2 µm.

In order to test the porous nitrogen-doped carbon electrode prepared by the method described above, porous nitrogen-doped carbon electrodes were made with the active materials on each electrode having a total mass of about 5.0 mg. A conventional three-electrode electrochemical test cell was used with a 6.0 M aqueous solution of KOH used as the electrolyte. In the test cell, an Ag/AgCl electrode was used as the reference electrode, and a Pt wire was used as the counter electrode. As will be described in detail below, cyclic voltammetry (CV) and cycle-life stability galvanostatic charge/discharge (GCD) were performed using an electrochemistry workstation (model CHI660D, manufactured by Chenhua Co. Ltd. of Shanghai, China).

Further, the practical electrochemical performance of the porous nitrogen-doped carbon electrode was assessed by assembling a symmetric supercapacitor using qualitative filter paper (grade 4), manufactured by Whatman® Paper Ltd. Co. of the United Kingdom, used as a separator, along with two porous nitrogen-doped carbon electrodes (each with the same mass of active materials of 5.0 mg) in a 6.0 M KOH aqueous solution. The areal capacitance, CA, of the electrodes was determined by the galvanostatic charge/discharge (GCD) curves as $CA=(I \times \Delta t)/(A \times \Delta V)$, where CA is measured in $F/cm^2$, I (measured in A) is constant current, $\Delta t$ (s) is discharge time of the GCD test, A is area ($cm^2$), and $\Delta V$ (V) is the voltage change excepting IR drop.

Figure 3:
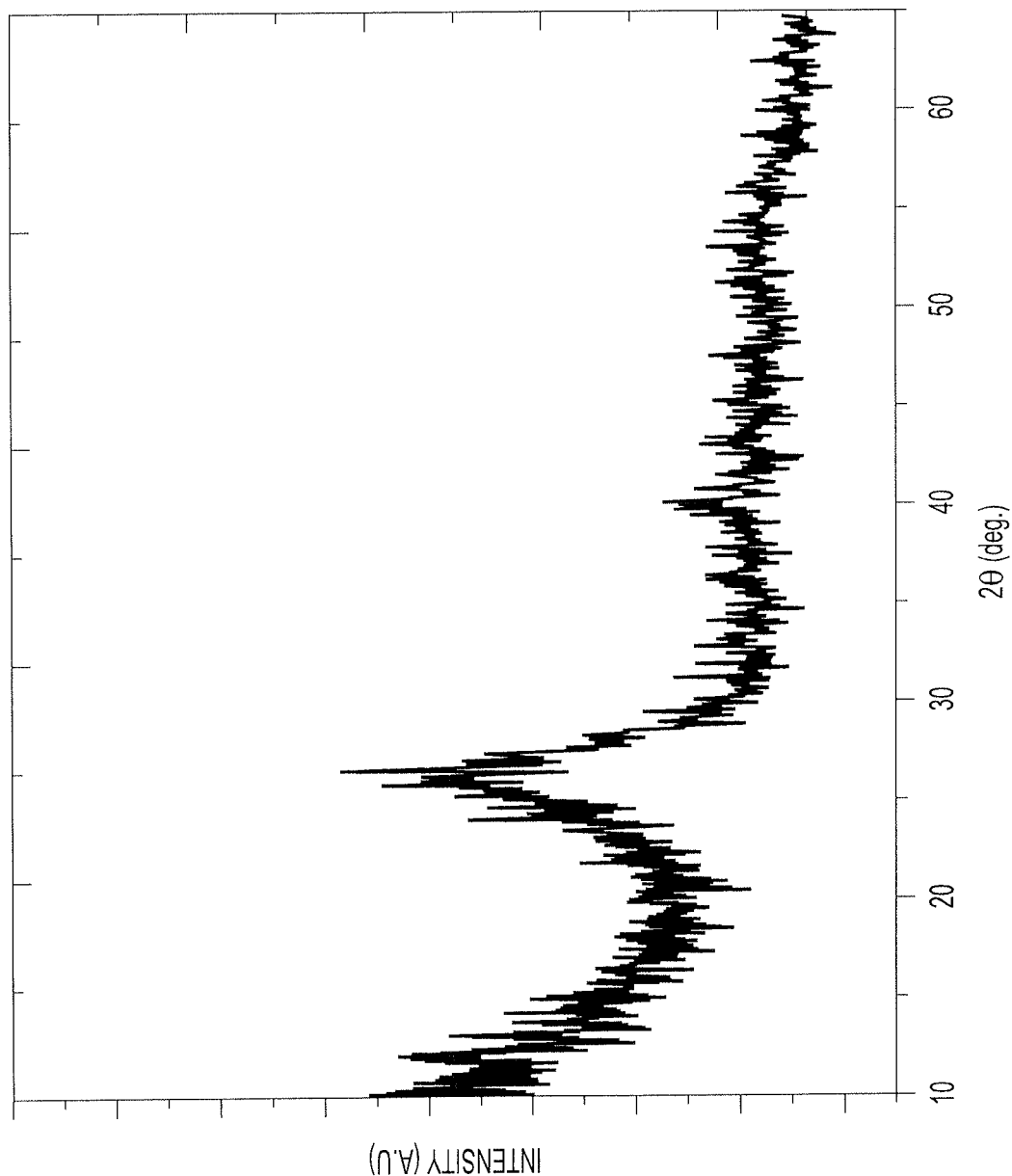
FIG. 3 shows X-ray diffraction (XRD) results of the porous nitrogen-doped graphite carbon prepared by the present method of making a porous nitrogen-doped carbon electrode from biomass.

FIG. 1 shows the Fourier-transform infrared spectroscopy (FTIR) results for the porous nitrogen-doped graphite carbon, made as described above, and FIG. 3 shows the X-ray diffraction (XRD) patterns for the porous nitrogen-doped carbon electrode. The XRD patterns show a broad peak at about 25.8°, corresponding to the (002) reflection of the turbostratic carbon structure, suggesting an amorphous structure with a low crystalline fraction. Another obvious peak is located at about 44.4°, which can be assigned to the (100) diffraction of the graphitic carbon with an amorphous and disordered structure, revealing a greater interlayer stacking extent in porous nitrogen-doped graphite carbon that can effectively enhance the electronic conductivity of the materials.

Figure 2:
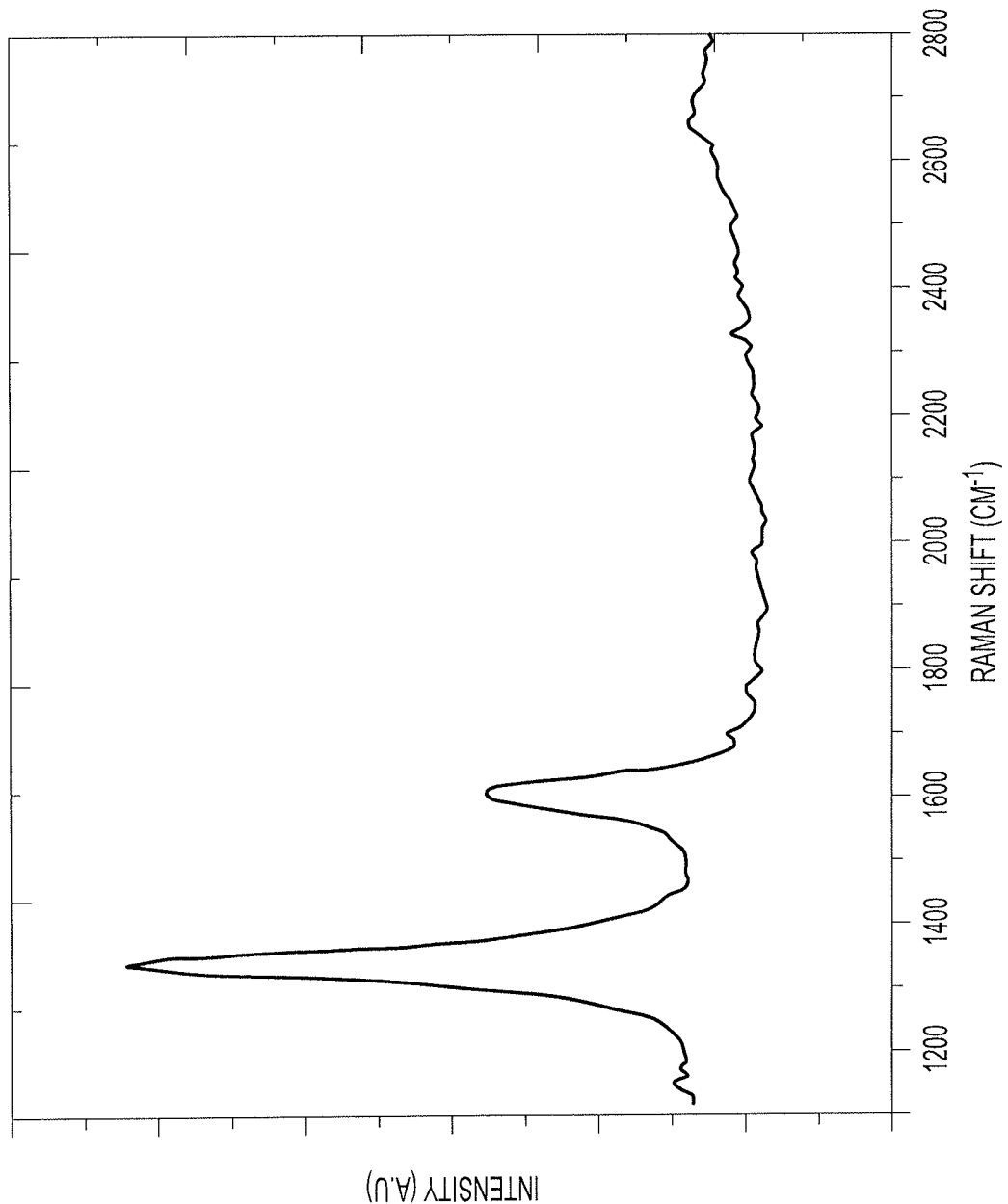
FIG. 2 is a graph showing Raman spectra of the porous nitrogen-doped graphite carbon prepared by the present method of making a porous nitrogen-doped carbon electrode from biomass.

The specific nature of the porous nitrogen-doped graphite carbon was further characterized by its Raman spectra, as shown in FIG. 2. As can be seen in FIG. 2, the peak centered at 1329 $cm^{-1}$ (D-band) is reflection of the defect and shows disorder in the samples. Another peak located at 1612 $cm^{-1}$ (G-band) can be assigned to the vibration of all $sp^2$ hybridized carbon atoms (both in chains and rings). The chemical environment of elements of C and N, and the composition of the as-prepared porous nitrogen-doped graphite carbon, were determined by elemental analysis characterization. The results revealed that the C, O and N content in the porous nitrogen-doped graphite carbon are 90.4%, 5.5% and 4.1%, respectively. It should be noted that the ratio of C:O is very high (20.8:1), suggesting good electron conductivity in the carbon material.

Figure 4:
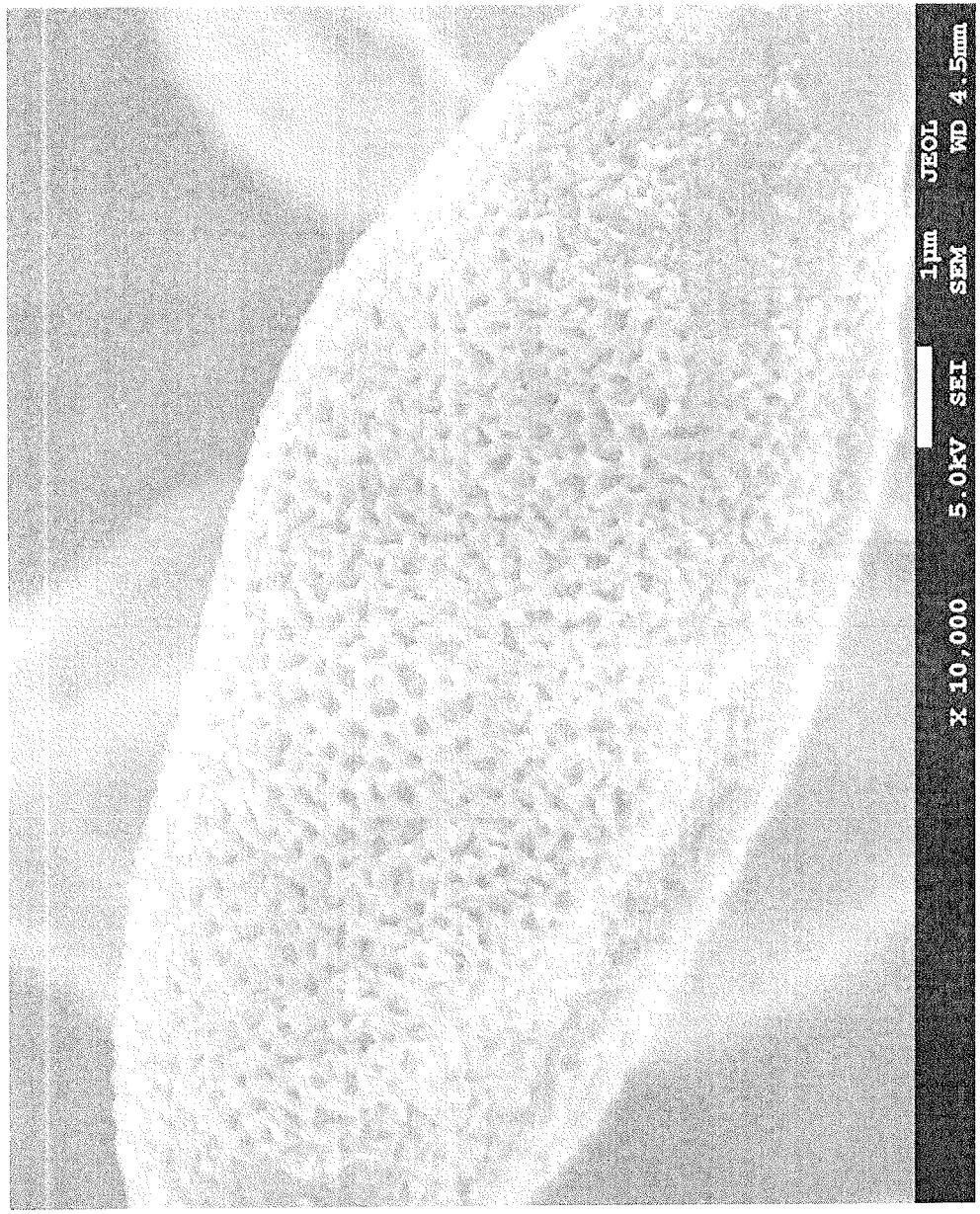
FIG. 4 is a scanning electron microscope (SEM) image of the porous nitrogen-doped graphite carbon prepared by the present method of making a porous nitrogen-doped carbon electrode from biomass.

Additionally, the porosity of the as-prepared porous nitrogen-doped graphite carbon was analyzed by $N_2$ adsorption-desorption measurements. The isotherms showed a pore volume of at least 0.8 $cm^3/g$. The macroporous carbon has a Brunauer-Emmett-Teller (BET) surface area within about 86-87 $m^2/g$. The morphology of the porous nitrogen-doped graphite carbon is shown in FIG. 4, where it can be seen that the porous nitrogen-doped graphite carbon has a porous, cage-type structure. The macroporous carbon has a size within the range of about 18-20 µm. The macroporous carbon material is in the form of carbon having a thickness of about 10-10.2 µm. Typically, the macroporous activated carbon will have a wall thickness of at least about 30.8-80.0 nm. Additionally, the macroporous activated carbon possesses a three-dimensional network structure with a mean pore diameter in the range of about 50 to about 450 nm, which can not only act an ion-buffering reservoir for electrolyte ion transportation, but also facilitate electrolyte ions to fast diffuse into the inner micropores of electrode materials, especially at high charging rates. It is interesting to note that an interconnected porous layered structure can also be observed, which can effectively shorten the electrolyte ion diffusion path and enhance the structure's stability during a rapid charge/discharge process.

Figure 5:
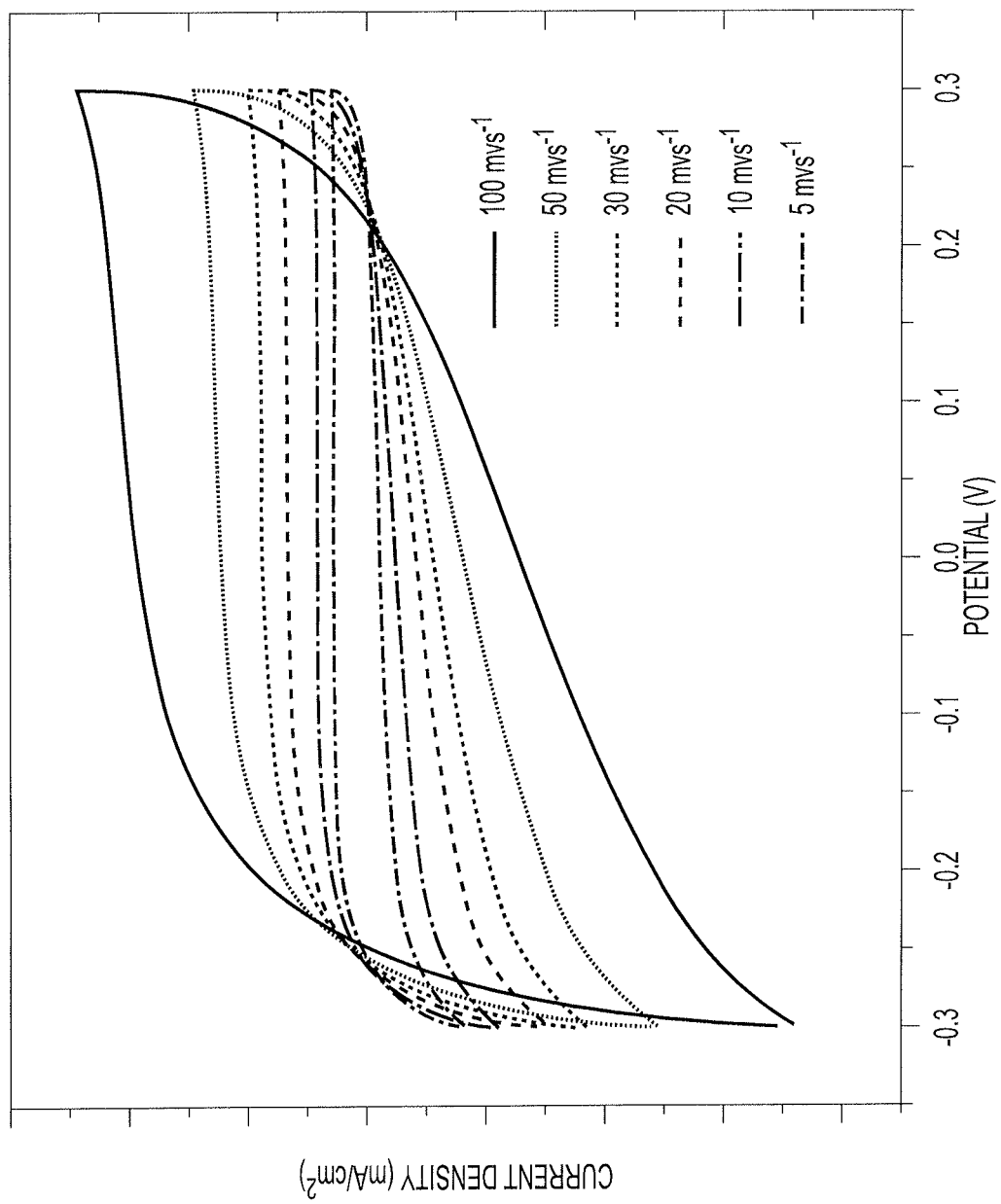
FIG. 5 shows cyclic voltammetry (CV) curves for a porous nitrogen-doped carbon electrode prepared by the present method of making a porous nitrogen-doped carbon electrode from biomass for different scan rates.

As noted above, the electrochemical properties of the porous nitrogen-doped graphite carbon were analyzed by cyclic voltammetry (CV) measurements in a three-electrode configuration using 6.0 M KOH aqueous solution as an electrolyte. As shown FIG. 5, the CV curves display a nearly symmetrical rectangular shape. The reversible behavior of the curves was maintained, even at a scan rate increased to 100 mV/s, suggesting a very high rate of performance. Further, GCD curves of the porous nitrogen-doped graphite carbon were obtained over various current densities, ranging from 0.5 to 50 A/g. The GCD curves presented a quasisymmetrical shape, rather than a completely symmetrical triangle. This may be due to the effect of heteroatom doping (O and N elements). Particularly, the N-doping (pyrrole and pyridine) could provide pseudo-capacity to the overall capacitance, thus causing the GCD curve to deform and deviate from a symmetrical triangle at low current densities.

Figure 6:
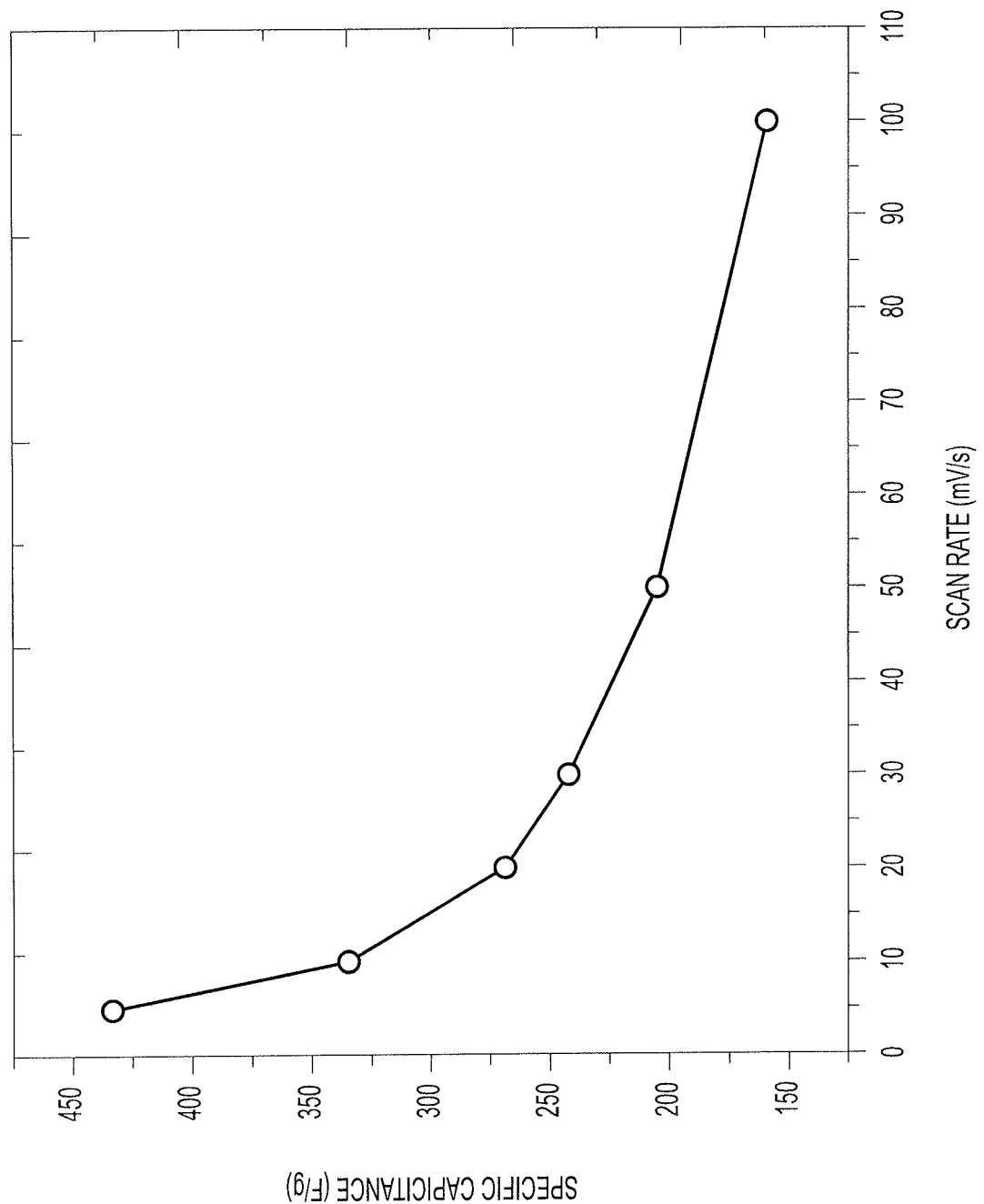
FIG. 6 is a plot showing specific capacitance of the porous nitrogen-doped carbon electrode prepared by the present method of making a porous nitrogen-doped carbon electrode from biomass as a function of scan rate.

FIG. 6 shows the specific capacitance of the porous nitrogen-doped graphite carbon electrodes calculated from the CV curves at various scan rates (5-100 mV/s). It has been demonstrated that the electrolyte ions on the electrode surface do not have adequate time to diffuse into the inner pores if the charging current increases. This is because a large amount of micropores make electrolyte ion transport difficult, particularly at high current densities. These results indicate that the micro-scale porous structure of the porous nitrogen-doped graphite carbon facilitates electrolyte ions to diffuse into inner active materials, especially with high active material loading.

It is to be understood that the method of making a porous nitrogen-doped carbon electrode from biomass is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making a porous nitrogen-doped carbon electrode from date palm (*Phoenix dactylifera* L.) pollen grains, comprising the steps of:

stirring a volume of date palm (*Phoenix dactylifera* L.) pollen grains into an aqueous solution of potassium hydroxide (KOH) for one hour to produce a precursor carbon solution;

drying the precursor carbon solution for a period of six hours at a temperature of 80° C. to produce precursor carbon;

heating the precursor carbon at a temperature of 800° C. for two hours under an argon atmosphere to produce porous nitrogen-doped graphite carbon;

washing the porous nitrogen-doped graphite carbon in an aqueous solution of HCl, deionized water, and ethanol;

drying the porous nitrogen-doped graphite carbon for 24 hours at a temperature of 80° C.;

mixing the porous nitrogen-doped graphite carbon with a polyvinylidene difluoride (PVDF) binder and carbon black in an isopropanol solvent to form a slurry; and coating nickel foam with the slurry to form a porous nitrogen-doped carbon electrode and dried at a temperature of 100° C., wherein the dried nitrogen-doped carbon electrode has a porous, cage-type structure wherein the pore volume is at least 0.8 $cm^3/g$, having a Brunauer-Emmett-Teller (BET) surface area within about 86-87 $m^2/g$, a wall thickness of at least about 30.8-80.0 nm and a mean pore diameter in the range of about 50 to about 450 nm.

2. The method of making a porous nitrogen-doped carbon electrode as recited in claim 1, wherein the step of heating the precursor carbon in inert atmosphere comprises heating the precursor carbon at a rate of 5° C./min.

3. The method of making a porous nitrogen-doped carbon electrode as recited in claim 1, further comprising the step of pressing the porous nitrogen-doped carbon electrode into a sheet electrode.

4. The method of making a porous nitrogen-doped carbon electrode as recited in claim 3, wherein the step of pressing the porous nitrogen-doped carbon electrode into the sheet electrode comprises pressing the porous nitrogen-doped carbon electrode at a pressure of 10 MPa.

* * * * *